United States Patent [19]

Okamoto et al.

[11] Patent Number: 4,728,203

[45] Date of Patent: Mar. 1, 1988

[54] RADIAL LOAD BEARING SYSTEM OF ROTARY KILN

[75] Inventors: Hiroshi Okamoto, Funabashi; Muneto Yamashita, Ichikawa, both of Japan

[73] Assignee: Kawasaki Jukogyo Kabushiki Kaisha, Hyogo, Japan

[21] Appl. No.: 80,202

[22] Filed: Jul. 29, 1987

Related U.S. Application Data

[63] Continuation of Ser. No. 802,249, Nov. 27, 1985, abandoned.

[30] Foreign Application Priority Data

Nov. 27, 1984 [JP] Japan .................. 59-250229

[51] Int. Cl.⁴ .............................................. F16C 27/04
[52] U.S. Cl. .................................... 384/549; 384/581
[58] Field of Search ................. 384/549, 581, 582; 34/108; 241/178; 248/130

[56] References Cited

U.S. PATENT DOCUMENTS

| | | | |
|---|---|---|---|
| 1,146,590 | 7/1915 | Newhouse | 384/549 |
| 3,338,109 | 8/1967 | Forsyth et al. | 384/549 |
| 3,436,062 | 4/1969 | Raevsky | 384/549 |

*Primary Examiner*—Lenard A. Footland

[57] ABSTRACT

A radial load bearing system of a rotary kiln wherein the rotary kiln is supported by a plurality of rollers held on a base and each roller is provided with its own holder means for holding the roller and its own resilient means for supporting the holder means, the holder means and the resilient means being arranged between the roller and the base.

8 Claims, 6 Drawing Figures

RADIAL LOAD BEARING SYSTEM OF ROTARY KILN

This application is a continuation of application Ser. No. 802,249, filed Nov. 27, 1985, abandoned.

BACKGROUND OF THE INVENTION

This invention relates to a radial load bearing system of a rotary kiln suitable for use in cement and chemical industries.

In a radial load bearing system of a rotary kiln of the prior art, a plurality of rollers supported by roller shafts maintained in contact with tires of the rotary kiln for rotation while having a radial load applied thereto are located in side-by-side relation and secured through respective bearing boxes to bases placed on the ground. In the radial load bearing system of this construction, it heas hitherto been customary to effect adjustments of the manner in which the tire is kept in contact with the rollers by causing the bearing boxes to move in sliding movement in a horizontal plane on the bases to affix each of the bearing boxes in a correct position.

The following disadvantages have been associated with the aforesaid radial load bearing system. Once each of the bearing boxes is affixed in place, it is impossible to effect adjustments of the manner in which the tire is kept in contact with the rollers until the next following operation for affixing the bearing boxes is performed. Thus, in the event that the main body of the rotary kiln undergoes expansion and contraction due to high temperature during operation, the center axis of the rotary kiln might become eccentric, thereby bringing the tire into contact with the rollers lopsidedly and causing them to suffer uneven wear. When more than three radial load bearing systems of this construction are used for one rotary kiln, a gap might be formed between the tires and rollers in some of the systems, and such system might be unable to satisfactorily perform the function of bearing the load at all times during the rotation of the rollers. This would cause the rest of the systems to bear an additional share of load, resulting in an overloading of these systems. When this phenomenon repeatedly occurs, wear and damage caused to the contacting surfaces of the tire and rollers would increase, making it necessary to repeatedly perform the operation of moving the bearing boxes in sliding movement toward the center axis of the rotary kiln and affixing them in correct positions.

In the radial load bearing system of the aforesaid construction, the horizontal components of forces exerted on the roller shafts by the weight of the rotary kiln are borne repeatedly by the bases located in side-by-side relation on the ground. This has made it necessary to use bases incorporating improvements in construction.

SUMMARY OF THE INVENTION

This invention has been developed for the purpose of obviating the aforesaid disadvantages of the prior art. Accordingly, the invention has as its object the provision of a radial load bearing system of a rotary kiln which is simple in construction and yet enables wear caused on the surfaces of the tire and rollers to be minimized while allowing the work of construction a base to be simplified.

The outstanding characteristics of the invention enabling the aforesaid object to be accomplished include supporting, through roller holder means, each of a plurality of roller located on the left and right by one of a plurality of resilient means, to provide a plurality of roller means assemblies located on the left and right, and connecting such roller means assemblies together by a pin having a center axis on a straight line connecting together the centers of the roller shafts of the left and right rollers.

DESCRIPTION OF THE PREFERRED EMBODIMENTS

Figure 1:
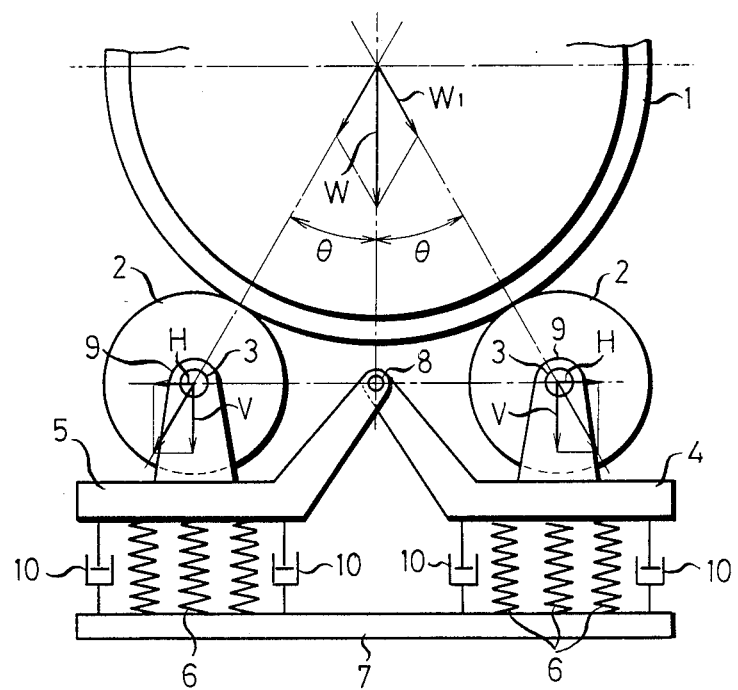
FIG. 1 is a view in explanation of the basic concept on which this invention is based.

Before describing in detail in preferred embodiments of the invention, the basic concept on which the invention is based will be described by referring to FIG. 1. A plurality of springs 6 are mounted between a plurality of roller holders 4 and 5 for left and right rollers 2 respectively and a spring bolster 7 to keep a tire 1 and the rollers 2 in contact with each other in good condition at all times by the resilience of the springs 6.

The left and right roller holders 4 and 5 are connected together by a rotatable pin 8 having a center axis aligned with a straight line connecting together the centers of roller shafts 3 located on the left and right and journalled by respective bearing boxes 9. The pin 8 may be equipped with a bush having a spherical surface. This allows the roller holders 4 and 5 to move in oscillating movement independently of each other.

In the event that there are possibilities that resonance might be caused to occur by the rigidity, weight and speed of rotation of the rotary kiln, variations in load due to the dropping of the contents of the kiln and the spring constants of the springs 6, damper means 10 may be provided to prevent the occurrence of the resonance.

Referring to FIG. 1, the weight (W) of the main body of the rotary kiln and its contents is transmitted through the rollers 2 on the left and right sides to the respective roller shafts 3, and the force exerted by the weight (W) can be broken down into horizontal forces (H) and a vertical force (V). By mounting the left and right rollers 2 in positions symmetrical with each other with respect to a vertical line passing through the center of the rotary kiln, the angle formed by this vertical line and a line connecting the center of the rotary kiln with the center of one of the rollers 2 becomes equal in size to the angle formed by the vertical line and a line connecting the center of the rotary kiln with the center of the other roller 2 (the angle $=\theta$), and the horizontal forces (H) acting leftwardly and rightwardly can be made equal to each other in magnitude although reversed in direction. Thus the horizontal forces (H) can be expressed by the following formula:

$$H = \frac{W}{2 \cos \theta} \cdot \sin \theta = \frac{W}{2} \cdot \tan\theta$$

By positioning the center of the pin 8 on a straight line connecting together the centers of the left and right roller shafts 3 on which the horizontal forces (H) are exerted, the horizontal forces (H) acting leftwardly and rightwardly can be made to cancel each other out. As a result, these forces merely act between the roller shafts 3, bearing boxes 9, roller holders 4 and 5 and pin 8 and are not transmitted to a spring bolster 7 and a base.

The rollers 2, roller shafts 3 and roller holders 4 and 5 are formed into a plurality of roller means assemblies located on the left and right and each acting as a unitary structure. The plurality of roller means assemblies are supported by the respective springs 6, so that the rollers 2 are urged by the biasing forces of the springs 6 to move upwardly at all times. Thus, even if the axis of the rotary kiln becomes eccentric, the tire 1 and rollers 2 are capable of rotation as they are maintained in contact with each other while keeping the vertical force (V) within a narrow range of variations in load which are proportional to the resilience of the springs 6.

By providing the pin 8 with a bush having a spherical surface, it is possible to cause the roller holders 4 and 5 to move in oscillating movement. Combined with the resilience of the springs 6, the oscillating movement of the roller holders 4 and 5 prevents the occurrence of lopsidedness in the surfaces of the tire 1 and rollers 2 in contact with each other. The springs 6 have characteristics such that their resilience acts not only in a vertical direction but also in a horizontal direction, so that the surfaces of the left and right rollers 2 and tire 1 are capable of following up the movement of the rotary kiln in the horizontal direction by accommodating the eccentricity of the rotary kiln.

The preferred embodiments of the invention will now be described by referring to the accompanying drawings.

Figure 2:
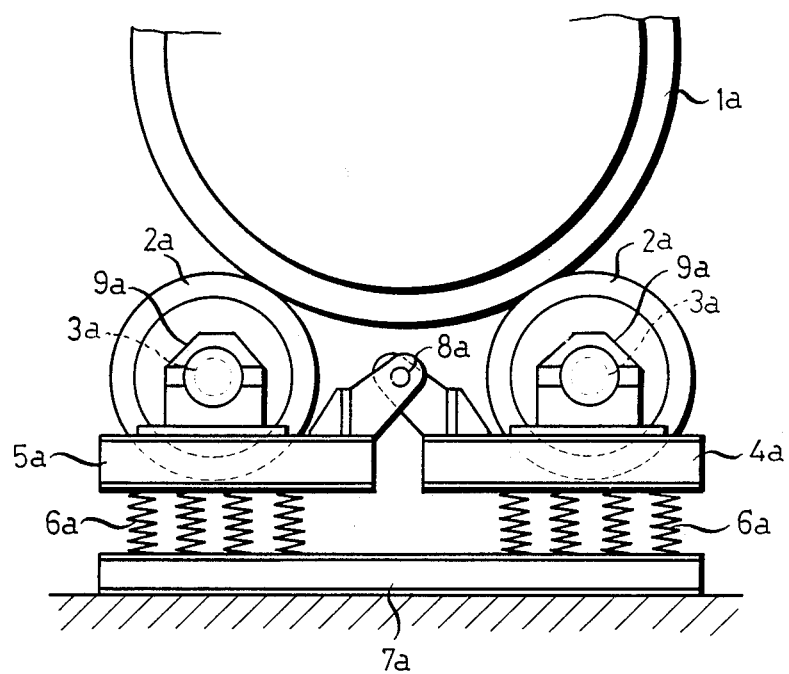
FIG. 2 is a front view of a first embodiment of the invention.
Figure 3:
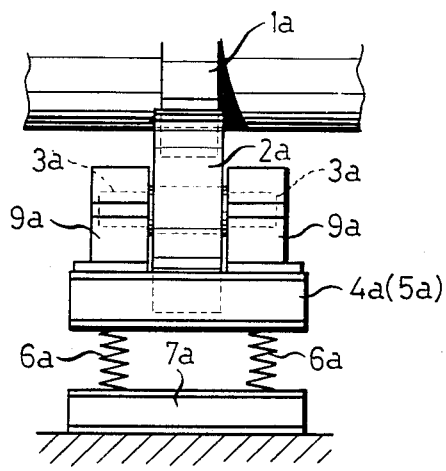
FIG. 3 is a side view of the embodiment shown in FIG. 1.

FIG. 2 is a front view of a first embodiment, and FIG. 3 is a side view of the embodiment shown in FIG. 2. As shown, a plurality of rollers 2a each supported by a roller shaft 3a are located on the left and right in positions symmetrical with each other with respect to a vertical line extending through the center of the rotary kiln. The roller 2a on the left is supported by a roller holder 5a through a plurality of bearing boxes 9a located on opposite sides o the roller 2a, and the roller 2a on the right side is also supported by a roller holder 4a through a plurality of bearing boxes 9a located on opposite sides of the roller 2a, to provide a plurality of roller means assemblies located in side-by-side relation on the left and right, respectively. The left and right roller means assemblies are connected together by a pin 8a having a center which is located immediately below the center of the rotary kiln and on a straight line connecting together the centers of the roller shafts 3a of the left and right roller means assemblies. The horizontal forces (H) acting leftwardly and rightwardly as described by referring to FIG. 1 merely act in the two roller means assemblies and are not transmitted to a spring bolster 7a and a base. The pin 8a is equipped with a bush having a spherical surface, so that the roller holders 4a and 5a are capable of moving in oscillating movement to prevent the occurrence of lopsidedness in the surfaces of the rollers 2a and the surface of a tire 1a. The springs 6a, which are coil springs having vertical and horizontal spring constants commensurate with the weight of the rotary kiln and variations in load, are mounted between a spring bolster 7a and the roller holders 4a and 5a to support the left and right roller means assemblies. At the same time, the springs 6a urge by their biasing forces the rollers 2a against the tire 1a at all times to keep the vertical force (V) described by referring to FIG. 1 in a narrow range of variations.

Figure 4:
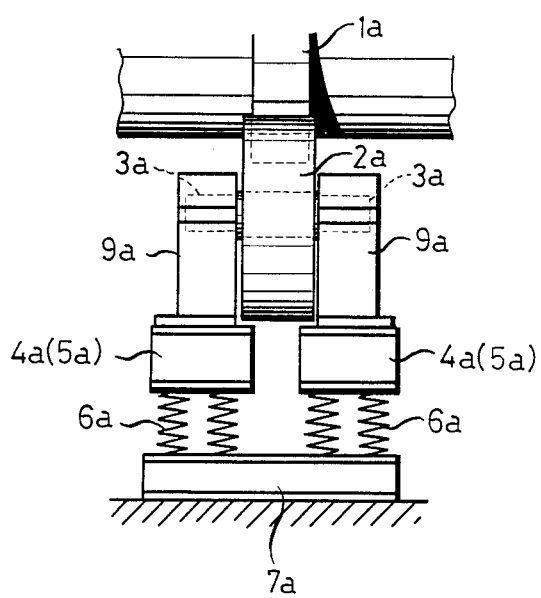
FIG. 4 is a side view of a modification of the first embodiment shown in FIGS. 2 and 3, in which the roller holder is split into two roller holder portions each for holding one of the two bearing boxes for each roller.

FIG. 4 shows a modification of the first embodiment shown in FIGS. 2 and 3 in a side view. As shown, the roller holders 4a and 5a of the plurality of roller means assemblies are each split into a plurality of roller holder portions each associated with one of the two bearing boxes 9a. In this modification, the oscillating angle of the roller holders 4a and 5a is greater than that of the roller holders 4a of the embodiment shown in FIGS. 2 and 3. In addition, the degree of freedom of the roller holders 4a and 5a are larger in the modification shown in FIG. 4 than in the embodiment shown in FIGS. 2 and 3. This makes the modification shown in FIG. 4 suitable for use when the center axis of the rotary kiln has a high degree of eccentricity or the surfaces of the rollers 2a and the surface of the tire 1a in contact with each other are greatly lopsided.

Figure 5:
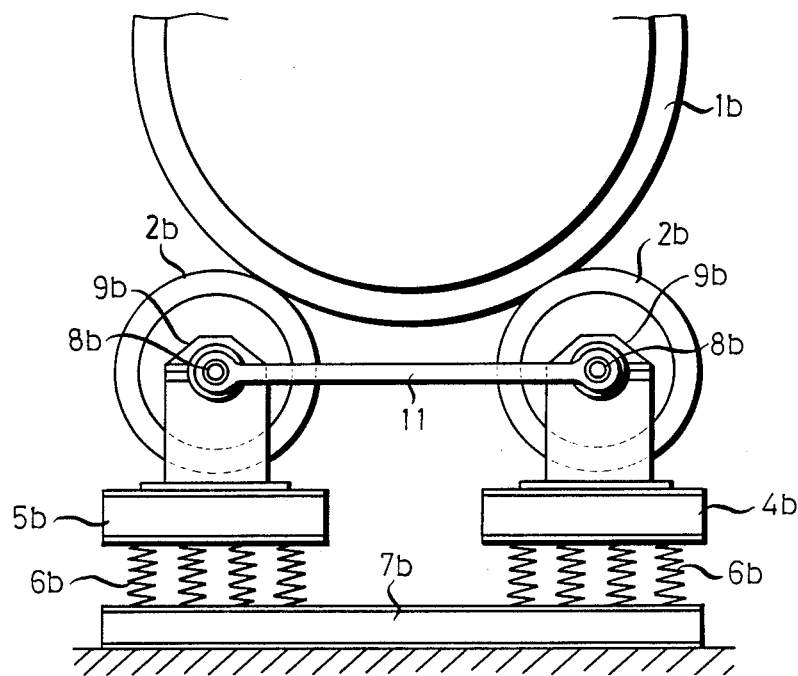
FIG. 5 is a front view of a second embodiment of the invention.
Figure 6:
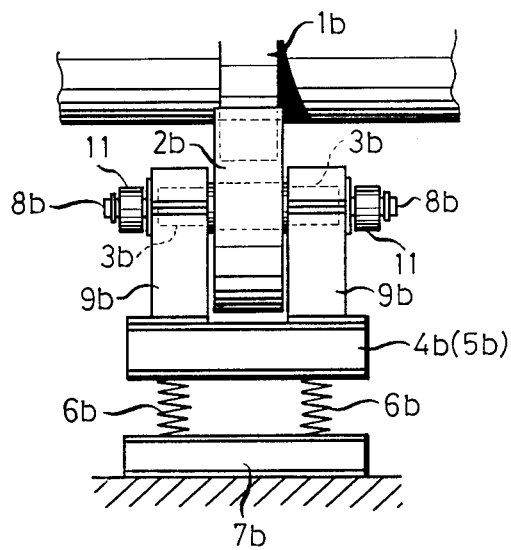
FIG. 6 is a side view of the embodiment shown in FIG. 5.

FIG. 5 is a front view of a second embodiment of the invention, and FIG. 6 is a side view thereof. The embodiment shown in FIGS. 5 and 6 is distinct from the embodiment shown in FIGS. 2 and 3 in that the plurality of roller means assemblies located on the left and right are connected together by a connecting rod 11 connected at either end thereof to one of a plurality of pins 8b coaxial with a roller shaft 3b and disposed on opposite sides of a roller 2b. This arrangement enables the horizontal forces (H) described by referring to FIG. 1 to positively cancel each other out to prevent them from being transmitted to outside from the roller means assemblies and the connecting rod 11.

The radial load bearing system according to the invention can achieve the following effects:

(1) The rotary kiln can be stably supported because the radial load applied to the rollers by the tire show no great variations at various points at which the load is borne.

(2) The use of the springs having spring constants commensurate with the weight of the main body of the rotary kiln and its contents enables the pressure at the surfaces of the rollers and tire in contact with each other to be maintained in a narrow range of variations. The arrangement whereby the roller holders can be moved in oscillating movement enables the occurrence of lopsidedness in the surfaces of the rollers and tire in contact with each other to be prevented. Thus the surfaces of the rollers and tire can be maintained in contact with each other more uniformly than in radial load bearing systems of the prior art. The use of spring means for supporting roller means assemblies enables uniform contact to be achieved even if wear is caused on the surfaces of the rollers and tire.

(3) The rollers are simple in construction and do not require means for allowing sliding movement.

(4) The horizontal forces exerted on the roller shafts are made to cancel each other out and prevented from being transmitted to outside from the roller means assemblies supported by the springs means. This prevents the horizontal forces exerted by the weight of the main body of the rotary kiln and its contents from acting on the base, allowing the work of constructing the foundation to be simplified.

(5) Expenses for effecting maintenance and inspection are smaller than in radial load bearing systems of the prior art.

(6) Vibrations caused to occur by the rotation of the kiln can be avoided.

What is claimed is:

1. A radial load bearing system of a rotary kiln comprising:
    a plurality of rollers located on the left and right of a vertical plane through the center of the rotary kiln, said rollers supporting the rotary kiln;
    a plurality of roller holder means each for holding one of said plurality of rollers at a roller shaft thereof;
    a plurality of resilient means for supporting, through one of said roller holder means, one of said plurality of rollers; and
    connecting means including a member for connecting said plurality of roller holder means on a straight line connecting the center of the roller shafts of said plurality of rollers.

2. A radial load bearing system as claimed in claim 1, wherein said member is a pin located on the straight line connecting the center of the roller shafts.

3. A radial load bearing system as claimed in claim 2, wherein said plurality of roller holder means is each split into a plurality of roller holder portions each associated with one of a plurality of bearing boxes of the roller shaft, and springs of each said resilient means are split into a plurality of groups of springs so that each group of springs can support one of said plurality of roller holder portions.

4. A radial load bearing system as claimed in claim 3, wherein a plurality of damper means each is located in parallel with one of said plurality of resilient means.

5. A radial load bearing system as claimed in claim 1, wherein said member is a connecting rod secured to a plurality of pins each located coaxially with a roller shaft of one of the plurality of rollers.

6. A radial load bearing system as claimed in claim 5, wherein said plurality of roller holder means is each split into a plurality of roller holder portions each associated with one of a plurality of bearing boxes of the roller shaft, and springs of each said resilient means are split into a plurality of groups of springs so that each group of springs can support one of said plurality of roller holder portions.

7. A radial load bearing system as claimed in claim 6, wherein a plurality of damper means each is located in parallel with one of said plurality of resilient means.

8. A radial load bearing system as claimed in claim 1, further comprising a plurality of damper means each located in parallel with one of said plurality of resilient means.

* * * * *